(12) United States Patent
West et al.

(10) Patent No.: US 8,322,657 B2
(45) Date of Patent: Dec. 4, 2012

(54) PANEL WITH IMPACT PROTECTION MEMBRANE

(75) Inventors: Colin John West, Bristol (GB); David Alistair Sutton, Bristol (GB); Fariborz F. Boozari, Bristol (GB)

(73) Assignee: Airbus Operations Limited, Bristol (GB)

( * ) Notice: Subject to any disclaimer, the term of this patent is extended or adjusted under 35 U.S.C. 154(b) by 1082 days.

(21) Appl. No.: 12/212,755

(22) Filed: Sep. 18, 2008

(65) Prior Publication Data

US 2009/0101759 A1    Apr. 23, 2009

(30) Foreign Application Priority Data

Oct. 18, 2007   (GB) .................... 0720387.0

(51) Int. Cl.
*B64C 3/20* (2006.01)
(52) U.S. Cl. ...................... 244/123.1; 244/133
(58) Field of Classification Search .............. 244/121, 244/123.1, 123.3, 123.5, 133, 117 R
See application file for complete search history.

(56) References Cited

U.S. PATENT DOCUMENTS

| | | | | |
|---|---|---|---|---|
| 2,655,459 | A | * | 10/1953 | Gordon et al. ............. 156/92 |
| 2,728,702 | A | * | 12/1955 | Simon et al. ............. 244/126 |
| 3,700,534 | A | * | 10/1972 | Cook ...................... 428/46 |
| 3,722,355 | A | * | 3/1973 | King ..................... 89/36.02 |
| 4,024,002 | A | * | 5/1977 | Lott ...................... 156/85 |
| 4,428,998 | A | * | 1/1984 | Hawkinson ............ 442/263 |
| 4,551,392 | A | | 11/1985 | Draexler |
| 4,835,063 | A | | 5/1989 | Jadamus et al. |
| 5,102,489 | A | | 4/1992 | Grosse-Puppendahl et al. |
| 5,251,414 | A | | 10/1993 | Duke |
| 5,306,558 | A | | 4/1994 | Takahashi et al. |
| 5,407,751 | A | | 4/1995 | Genske et al. |
| 5,425,973 | A | | 6/1995 | Frangipane et al. |
| 5,556,695 | A | * | 9/1996 | Mazelsky ............... 442/203 |
| 5,983,945 | A | | 11/1999 | Salmon |
| 6,076,769 | A | | 6/2000 | Gallegos |
| 7,478,579 | B2 | * | 1/2009 | Carberry et al. ......... 89/36.02 |
| 7,736,719 | B2 | * | 6/2010 | Cattaneo et al. ......... 428/157 |
| 7,866,605 | B2 | * | 1/2011 | Lee et al. ................ 244/121 |
| 8,006,605 | B2 | * | 8/2011 | Tunis et al. ............. 89/36.02 |
| 2007/0009694 | A1 | | 1/2007 | Monk et al. |

FOREIGN PATENT DOCUMENTS

| | | |
|---|---|---|
| EP | 0358465 A2 | 3/1990 |
| EP | 0710544 A2 | 5/1996 |
| EP | 0962311 A1 | 12/1999 |
| JP | 6128390 | 5/1994 |

(Continued)

OTHER PUBLICATIONS

UK Search Report for GB0720387.0 dated Feb. 13, 2008.

(Continued)

*Primary Examiner* — Rob Swiatek
(74) *Attorney, Agent, or Firm* — Lowe Hauptman Ham & Berner, LLP

(57) ABSTRACT

An aircraft leading edge panel having an outer aerodynamic surface; and an inner surface carrying the elastomeric impact protection membrane. The membrane comprises a woven or knitted fabric which is impregnated with an elastomeric material. The membrane and the panel may be bonded by an adhesive or co-cured to bond the membrane to the panel. The membrane provides impact protection to the panel by de-bonding from the face of the panel and absorbing at least part of the energy of an object impacting the panel.

14 Claims, 5 Drawing Sheets

FOREIGN PATENT DOCUMENTS

| | | |
|---|---|---|
| JP | 9143278 | 6/1997 |
| WO | 91/12136 A1 | 8/1991 |
| WO | 2004/076175 A1 | 9/2004 |
| WO | 2004/098993 A1 | 11/2004 |
| WO | 2006/001548 A2 | 1/2006 |
| WO | 2007/025782 A1 | 3/2007 |

OTHER PUBLICATIONS

UK Search Report for GB0720387.0 dated Jun. 27, 2008.

* cited by examiner

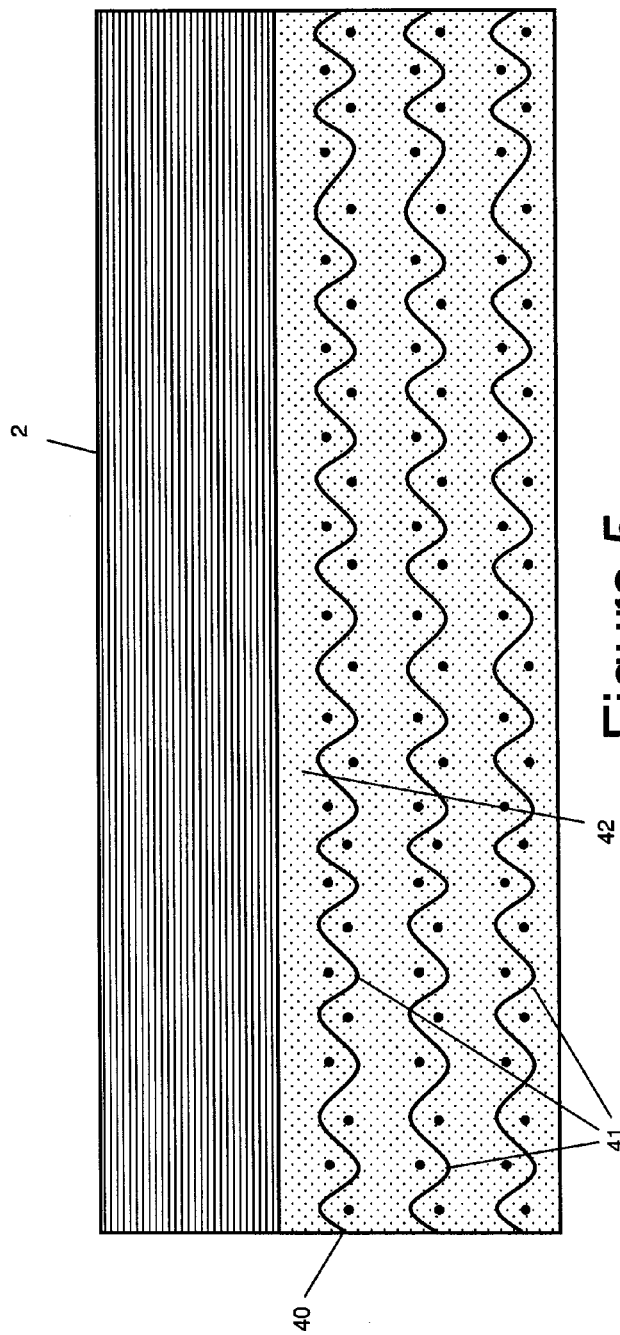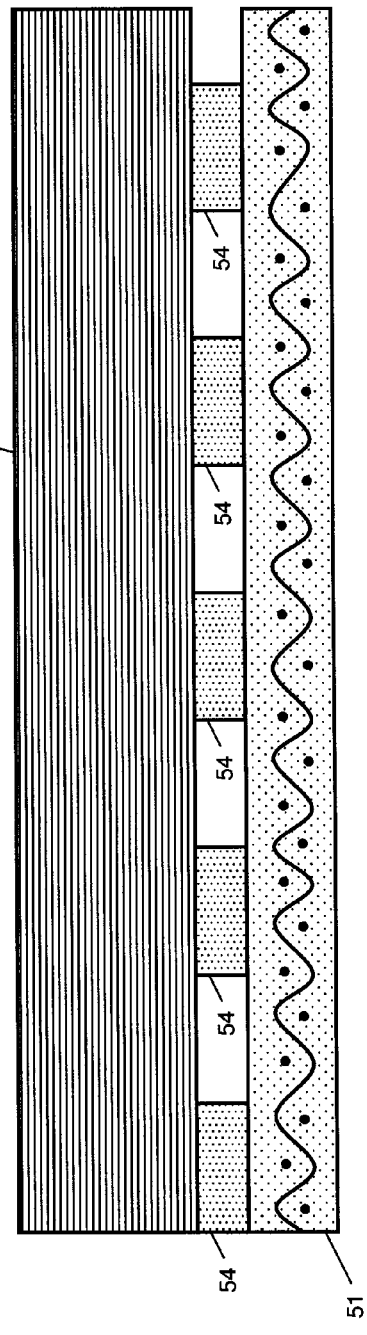
Figure 5
Figure 6

PANEL WITH IMPACT PROTECTION MEMBRANE

RELATED APPLICATIONS

The present application is based on, and claims priority from, British Application Number 0720387.0, filed Oct. 18, 2007, the disclosure of which is hereby incorporated by reference herein in its entirety.

FIELD OF THE INVENTION

The present invention relates to an aircraft leading edge panel with an impact protection membrane, and a method of using a panel to providing impact protection.

BACKGROUND OF THE INVENTION

A projectile barrier and method is described in US 2007/0009694. An elastomeric bonding layer is spray-coated on the outside surface of a fuel tank. A composite expansion layer is then spray-coated on the bonding layer. Finally, a compression layer is spray-formed to the desired thickness on the outside of the expansion layer. When a bullet penetrates the fuel tank wall, the expansion layer comes into contact with the fuel and expands to fill the bullet hole. Whilst being suitable for providing protection against a small projectile such as a bullet, the barrier is less effective against a larger projectile. Also, the barrier is only effective in protecting a fuel tank wall. Also, the spray-coating process requires the elastomer to dissolve in a solvent, and so only relatively low molecular weight elastomers can be used.

WO 2004/098993 describes an aircraft wing with a leading edge containing a foam or honeycomb material which absorbs the impact of a bird strike.

SUMMARY OF THE INVENTION

A first aspect of the invention provides an aircraft leading edge panel having an outer aerodynamic face; an inner face; and an elastomeric impact protection membrane bonded to the inner face of the panel.

The leading edge panel can at least partially absorb the energy of an object such as a bird and thus protect structure (such as a front spar) behind the panel. The leading edge panel may be positioned in a variety of leading-edge locations on the aircraft, including but not limited to the leading-edge of a slat, wing, tail-plane, fuselage or engine nacelle.

Preferably the membrane comprising a woven or knitted fabric which is impregnated with an elastomeric material. The fabric-reinforced membrane provides effective protection against a range of impacts, and can also be used to provide impact protection for a variety of articles including fuel tanks, or articles in which there is no fuel in contact with the panel.

Typically the panel comprises a resin which is co-cured with the membrane.

Typically the panel comprise a fibre-reinforced polymer. For example in the embodiments of the invention described below the panel comprises a series of plies of pre-impregnated carbon-fibre reinforced epoxy resin. Alternatively the fibre-reinforced polymer panel may be formed, for example, by infusing a fabric pre-form with a liquid resin.

The panel may comprise a thermosetting material which is heated in contact with the impact protection membrane to co-cure the panel and the membrane. Alternatively the panel may comprise a thermoplastic material which is heated to mould the panel into a desired shape and then allowed to cool in contact with the impact protection membrane to co-cure the panel and the membrane.

Typically the membrane comprises an elastomeric material with a molecular weight greater than 5,000 and/or a density lower than 1.6 $Mgm^{-3}$.

Examples of suitable elastomeric materials include polyurethane, fluorosilicone rubber, polychloroprene rubber, acrylonitrile butadiene rubber, or ethylene propylene diene monomer (EPDM) rubber.

One or more fasteners may pass through the membrane and the panel.

Typically the membrane is configured to de-bond from the face of the panel to absorb at least part of the energy of an object impacting the panel, by adhesive or cohesive failure.

A further aspect of the invention provides a method of providing impact protection, the method comprising bonding an elastomeric membrane to a face of a panel; and de-bonding the elastomeric membrane from the face of the panel to absorb at least part of the energy of an object impacting the panel.

BRIEF DESCRIPTION OF THE DRAWINGS

Embodiments of the invention will now be described with reference to the accompanying drawings, in which:

FIG. 5 is a cross-sectional view showing an alternative impact protection membrane; and FIG. 6 is a cross-sectional view showing a further alternative impact protection membrane.

DETAILED DESCRIPTION OF EMBODIMENT(S)

Figure 1:
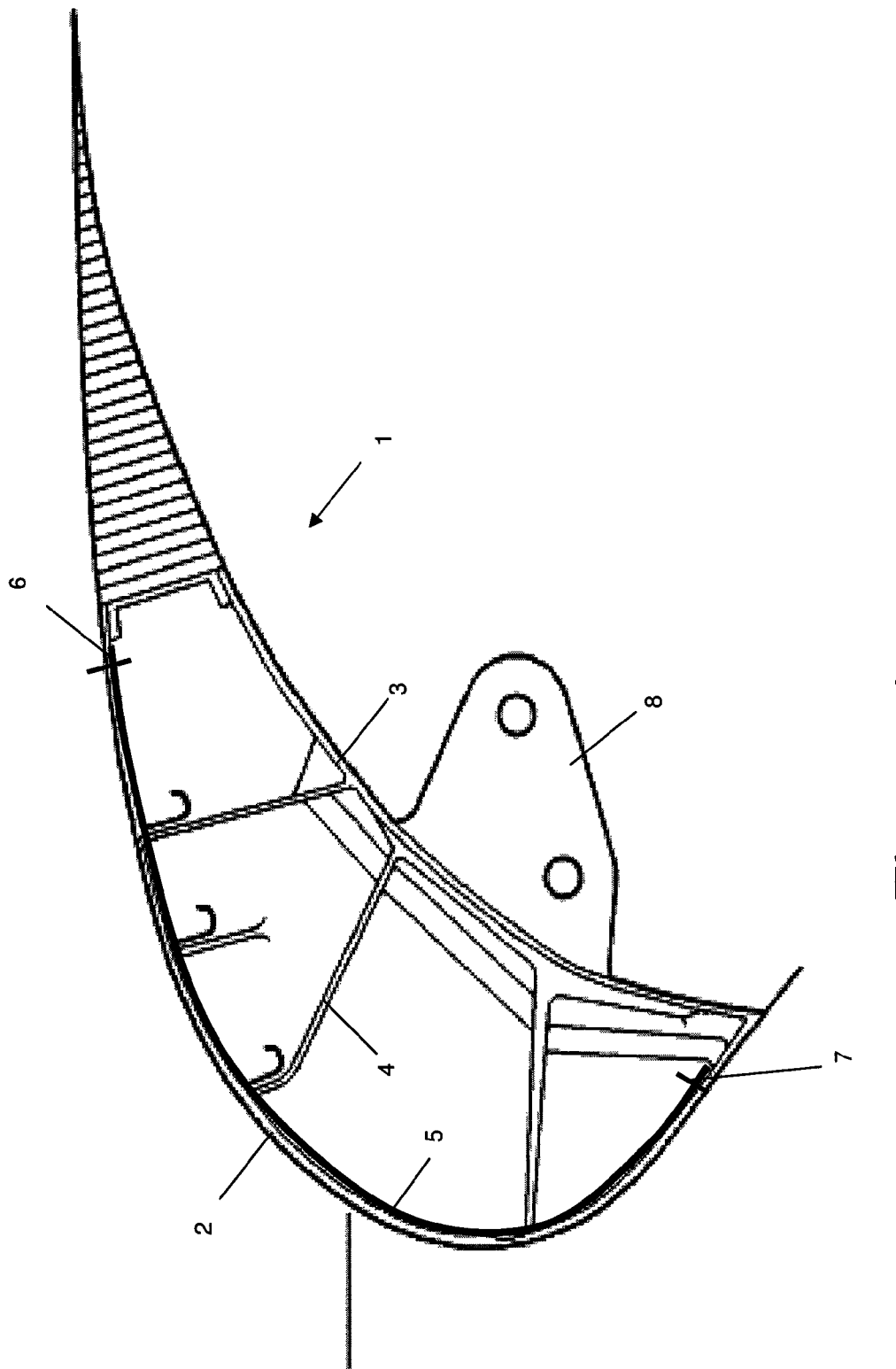
FIG. 1 is a cross-sectional view of a slat.

FIG. 1 is a cross-sectional view of a slat 1 which is attached to the leading edge of a wing (not shown) by a bracket 8. The slat 1 has a front skin panel 2 and a rear skin panel 3 which are connected by ribs 4.

The front skin panel 2 presents the leading edge of the slat and is therefore susceptible to damage from bird strike. As shown in detail in FIG. 2, the skin panel 2 comprises an outer aerodynamic face 9; an inner face 10; and an impact protection membrane 5 bonded to the inner face 10.

Figure 2:
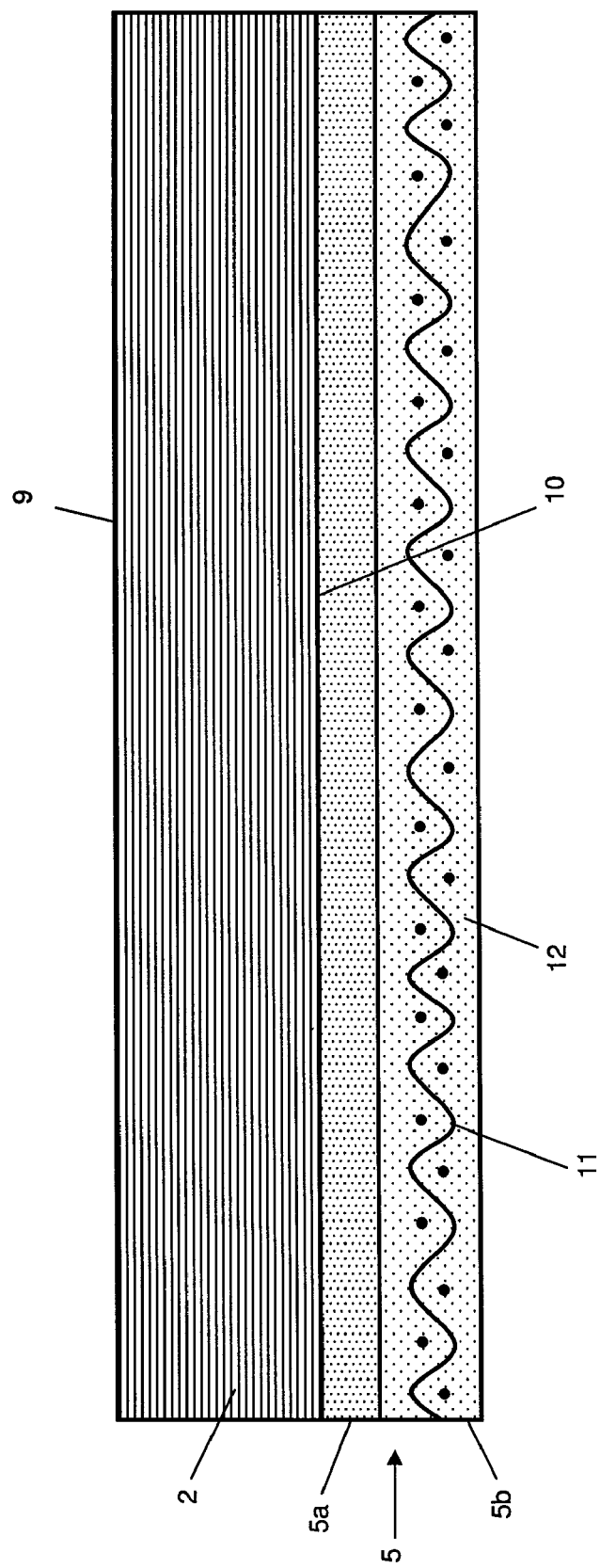
FIG. 2 is a cross-sectional view through the skin panel and impact protection membrane.
Figure 3:
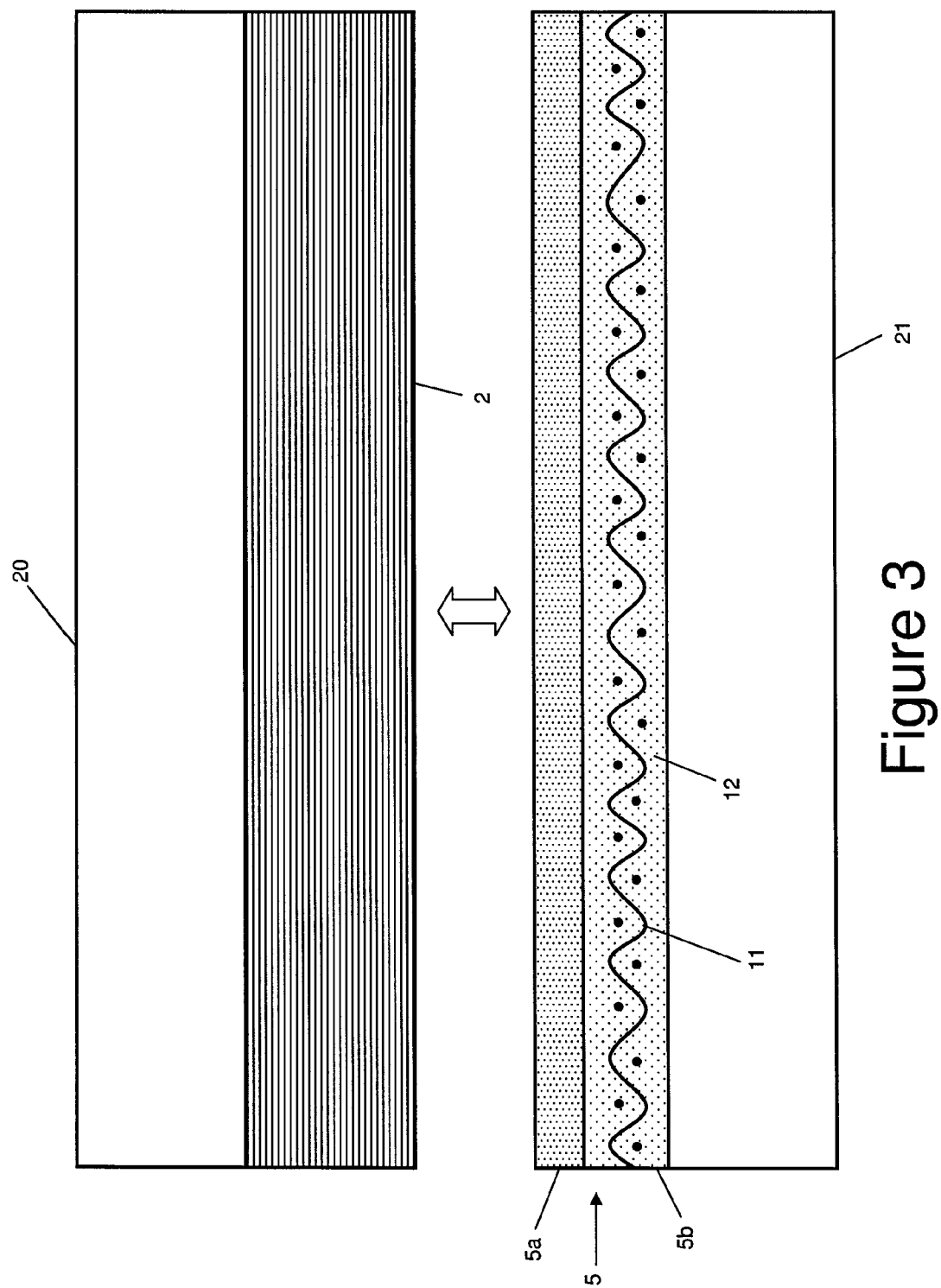
FIG. 3 is a cross-sectional view through a co-curing assembly.

The impact protection membrane 5 comprises an elastomeric layer 5b which is bonded to the inner surface 10 by an adhesion layer 5a. A method of co-curing the membrane 5 to the skin panel 2 is shown in FIG. 3. The skin panel 2 comprises a series of plies of pre-impregnated carbon-fibre reinforced epoxy resin. Each ply is conventionally known as a "prepreg". The stack of prepregs is laid onto a female mould tool 20 in a partially cured state. The elastomeric layer 5b comprises a layer of fabric 11 which is impregnated by a calendering process with a polyurethane material with a molecular weight of the order of 20,000-30,000 (or higher) and a density of the order of 1.35 to 1.55 $Mgm^{-3}$. The fabric 11 may be formed from a variety of materials including (but not limited to) Kevlar, polyester and glass. Although only one layer of fabric is illustrated in FIGS. 2 and 3, in practice a number of such layers may be used. The layer 5b is laid onto a male mould tool 21. The mould assembly is then completed by laying the adhesion layer 5a onto the layer 5a. The adhesion layer may be formed from a variety of materials including (but not limited to) an elastomer (such as polysulphide) with a hardness of approximately 35 IRHD. The adhesion layer 5a may be uncured or partially cured.

The membrane 5 and the panel 2 are then co-cured by placing the mould assembly into an autoclave, and heating the assembly as the membrane 5 and panel 2 are compressed together between the pair of mould tools 20,21.

The panel 2 with the co-cured membrane 5 is then removed from the mould assembly and fasteners 6, 7 (shown in FIG. 1) are passed through the periphery of the membrane 5 and the skin panel 2 to form high strength adhesion at the edges of the membrane.

Figure 4:
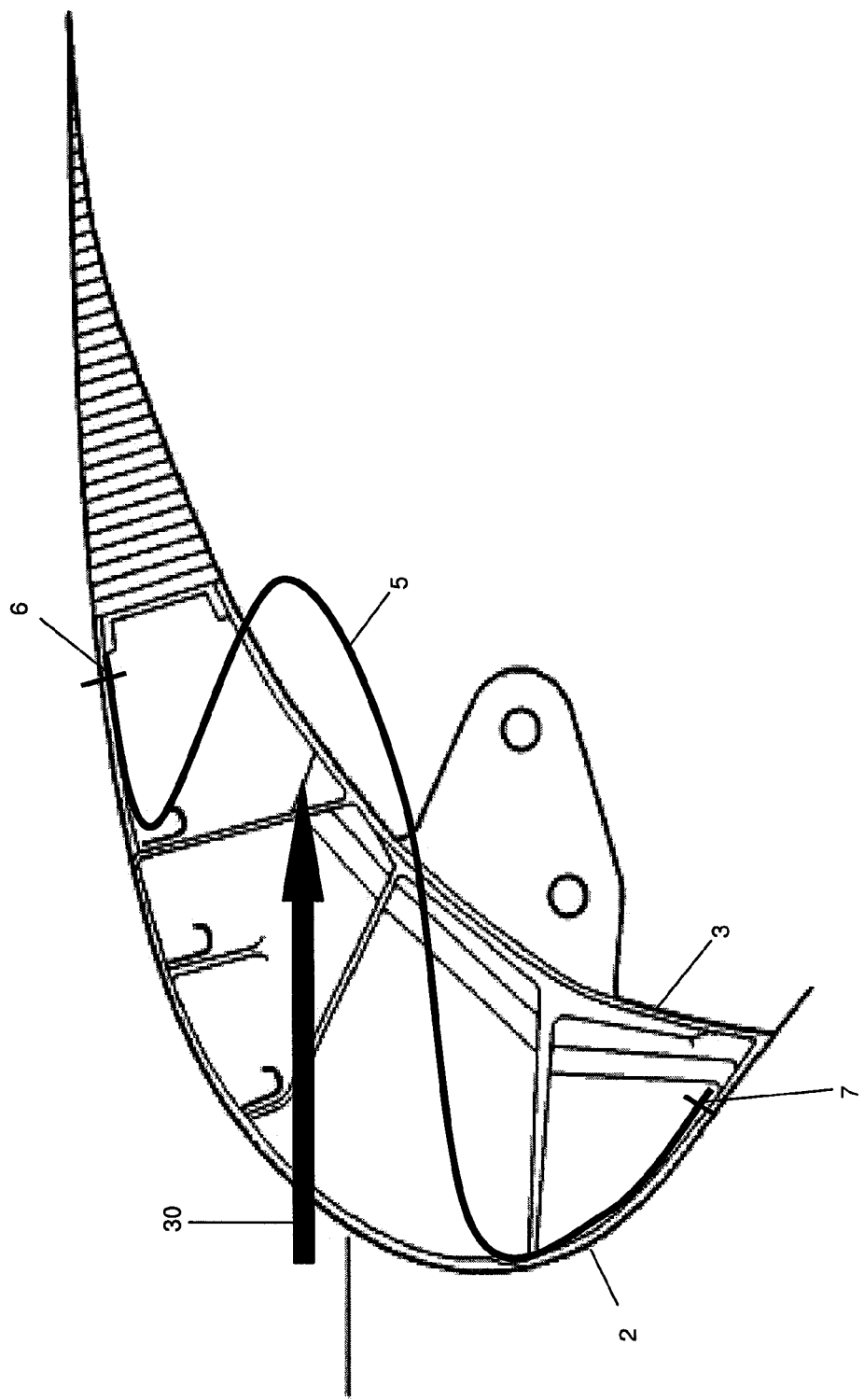
FIG. 4 is a cross-sectional view of the slat showing deformation of the impact protection membrane.

The membrane 5 absorbs at least part of the energy 30 of a object (such as a bird) impacting the outer aerodynamic surface 9 of the skin panel 2 by the mechanism illustrated schematically in FIG. 4. Initially the impact causes the panel 2 to shatter. The membrane then absorbs the energy 30 by progressively de-bonding from the skin panel radially away from the initial impact site, and deforming into the air gap behind the panel in the manner shown in FIG. 4. The fasteners 6,7 prevent the edges of the membrane from detaching from the skin panel. De-bonding may occur by adhesive failure between the adhesion layer 5a and the skin panel 2, by adhesive failure between the adhesion layer 5a and the layer 5b, or more preferably by cohesive failure of the adhesion layer 5a.

FIG. 5 shows an alternative impact protection membrane 40. In this case the membrane has no discrete adhesion layer formed from a different elastomeric material. Instead, the membrane 40 comprises three layers of fabric reinforcement 41 impregnated with a polyurethane matrix which is co-cured to the skin panel 2. In this case cohesive failure may propagate by fracture of the matrix-rich layer 42 next to the panel 2 and/or by fracture of one of the matrix-rich layers between a pair of fabric layers 41.

The fabric layers 41 may all be formed from the same fibre and the same structure. Alternatively the fibre material and/or structure of the layers may vary between layers to weaken the adhesive and/or cohesive strength of the membrane close to the panel. For example the fabric layer closest to the panel 2 may be formed with a closer weave than the other layers and/or formed with fibres with a lower cohesive strength than the fibres in the other layers.

The structure of one or more of the layers may also be tailored to give different properties in different directions. For instance one or more of the layers may be knitted to give greater elasticity in one direction than in others, in order to propagate cohesive and/or adhesive failure of the membrane in a desired direction.

FIG. 6 shows a further alternative impact protection membrane 50. In this case the impact protection membrane comprises a fabric-reinforced elastomeric layer 51 which is bonded to the inner surface of a skin panel 52 by an adhesion layer formed by a series of circular dots of adhesive 54. The adhesive dots are applied in a two-dimensional array to the panel 52—only one row of the array being shown in the cross-section of FIG. 6. The adhesive is applied by placing a mask on the skin panel, dipping a roller in liquid adhesive, and rolling the roller across the mask so that the adhesive passes through holes in the mask and selectively coats the skin panel 52. The mask is then removed and before the adhesive cures the elastomeric layer 51 is pressed against the adhesive. The adhesive subsequently cures and bonds the layer 51 to the skin panel 52. The adhesive may comprise an epoxy adhesive or rubber solution adhesive.

The membrane 51 absorbs at least part of the energy of a object (such as a bird) impacting the outer aerodynamic surface of the skin panel 52 by a mechanism similar to that of the membranes 5 and 40. Initially the impact causes the panel 52 to shatter. The layer 51 then absorbs the energy by progressively de-bonding, adhesive dot by adhesive dot, away from the skin panel and radially away from the initial impact site.

The skin panel 52 may be formed from any material including a cured composite, or Aluminium.

Although the invention has been described above with reference to one or more preferred embodiments, it will be appreciated that various changes or modifications may be made without departing from the scope of the invention as defined in the appended claims.

The invention claimed is:

1. An aircraft leading edge panel assembly comprising a panel having an outer aerodynamic face and an inner face; and an elastomeric impact protection membrane bonded to the inner face of the panel, wherein the membrane is configured to de-bond from the face of the panel to absorb at least part of the energy of an object impacting the panel.

2. The panel assembly of claim 1 wherein the membrane comprises a woven or knitted fabric which is impregnated with an elastomeric material.

3. The panel assembly of claim 1 wherein the membrane and the panel are co-cured to bond the membrane to the panel.

4. The panel assembly of claim 3 wherein the panel comprises a resin which is co-cured with the membrane.

5. The panel assembly of claim 3 wherein the membrane and the panel are co-cured by heating them together.

6. The panel assembly of claim 1 wherein the membrane comprises an elastomeric material with a molecular weight greater than 5,000.

7. The panel assembly of claim 1 wherein the membrane comprises an elastomeric material with a density lower than 1.6 $Mgm^{-3}$.

8. The panel assembly of claim 1 further comprising one or more fasteners which pass through the membrane and the panel.

9. An aircraft comprising a panel assembly according to claim 1.

10. An aircraft leading edge panel assembly comprising a panel having an outer aerodynamic face and an inner face; and an elastomeric impact protection membrane bonded to the inner face of the panel, wherein the membrane is configured to de-bond from the face of the panel by cohesive failure to absorb at least part of the energy of an object impacting the panel.

11. A method of providing impact protection, the method comprising bonding an elastomeric membrane to a face of a panel; and de-bonding the elastomeric membrane from the face of the panel to absorb at least part of the energy of an object impacting the panel, wherein the panel comprises an aircraft leading edge panel.

12. The method of claim 11 wherein the membrane de-bonds from the face of the panel by cohesive failure.

13. The method of claim 11 wherein the membrane de-bonds from the face of the panel by cohesive adhesive failure.

14. The method of claim 11 wherein the panel comprises an aircraft panel.

* * * * *